US012654361B2

(12) United States Patent
Siegl et al.

(10) Patent No.: US 12,654,361 B2
(45) Date of Patent: Jun. 16, 2026

(54) PROCESS FOR DEODORIZATION OF RECYCLED POLYOLEFIN PELLETS

(71) Applicant: ALPLA WERKE ALWIN LEHNER GMBH & CO. KG, Hard (AT)

(72) Inventors: Robert Siegl, Dornbirn (AT); Michael Heyde, Bergisch Gladbach (DE)

(73) Assignee: ALPLA WERKE ALWIN LEHNER GMBH & CO., Hard (AT)

( * ) Notice: Subject to any disclaimer, the term of this patent is extended or adjusted under 35 U.S.C. 154(b) by 927 days.

(21) Appl. No.: 17/995,402

(22) PCT Filed: Mar. 31, 2021

(86) PCT No.: PCT/EP2021/058412
§ 371 (c)(1),
(2) Date: Oct. 3, 2022

(87) PCT Pub. No.: WO2021/198323
PCT Pub. Date: Oct. 7, 2021

(65) Prior Publication Data
US 2023/0166428 A1 Jun. 1, 2023

(30) Foreign Application Priority Data
Apr. 3, 2020 (CH) ........................................ 402/20

(51) Int. Cl.
*B29B 9/16* (2006.01)
*B29B 9/06* (2006.01)
(Continued)

(52) U.S. Cl.
CPC ................ *B29B 9/16* (2013.01); *C08J 11/06* (2013.01); *B29B 9/065* (2013.01);
(Continued)

(58) Field of Classification Search
CPC ..... B29B 9/16; B29B 9/065; B29B 2009/168; B29B 2105/26; C08J 2323/00; C08J 11/06
(Continued)

(56) References Cited

U.S. PATENT DOCUMENTS

| | | | | |
|---|---|---|---|---|
| 5,521,264 A | | 5/1996 | Mehra | |
| 5,611,150 A | * | 3/1997 | Yore, Jr. ................... | B29B 9/16 |
| | | | | 34/166 |

(Continued)

FOREIGN PATENT DOCUMENTS

| | | | | |
|---|---|---|---|---|
| CA | 2804778 C | * | 2/2019 | ............. F25J 3/0685 |
| CH | 717294 A1 | * | 10/2021 | ........... B29B 13/065 |

(Continued)

OTHER PUBLICATIONS

Schneider H., Wilms H, "Entgasen von Polymeren in Silos bei der Kunststoff-Herstellung" In: Lehrbuch Aufbereitungstechnik 2006, Jan. 1, 2006, VDI WISSENSFORUM IWB GMBH, VDI-GESELLSCHAFT KUNSTOFFTECHNIK, pp. 21-29.

*Primary Examiner* — Stephen M Gravini
(74) *Attorney, Agent, or Firm* — Morriss O'Bryant Compagni Cannon, PLLC.

(57) ABSTRACT

Process for deodorization of recycled polyolefin pellets (23) in three steps: In a first step, the moist pellets (23) are contacted with a circulating inert gas at a temperature between 110° C. and 160° C. in a steam stripper (11), and the steam is precipitated in a condensate trap (29). In a second step, the pellets (23) are sent to a vacuum silo (13) under negative pressure and contacted with a gas flowing in countercurrent. In a third step, after the vacuum silo (13) the pellets (23) are sent to a first heat exchanger (15) and contacted with the gas flowing in countercurrent from the second step.

17 Claims, 1 Drawing Sheet

(51) Int. Cl.
B29K 23/00           (2006.01)
B29K 105/26          (2006.01)
C08J 11/06           (2006.01)

(52) U.S. Cl.
CPC ..... *B29B 2009/168* (2013.01); *B29K 2023/00*
(2013.01); *B29K 2105/26* (2013.01); *C08J*
*2323/00* (2013.01)

(58) Field of Classification Search
USPC ......................................................... 34/403
See application file for complete search history.

(56)               References Cited

U.S. PATENT DOCUMENTS

| | | | | |
|---|---|---|---|---|
| 5,638,606 | A * | 6/1997 | Bryan ..................... | F26B 17/22 |
| | | | | 34/166 |
| 5,741,350 | A | 4/1998 | Rowles | |
| 7,786,254 | B2 * | 8/2010 | Baita ......................... | B01J 8/24 |
| | | | | 528/483 |
| 8,151,482 | B2 * | 4/2012 | Moss ........................ | F26B 3/06 |
| | | | | 34/497 |
| 8,444,923 | B2 * | 5/2013 | Persinger ............. | B29B 13/065 |
| | | | | 264/102 |
| 8,835,576 | B2 * | 9/2014 | Force ........................ | B29B 9/16 |
| | | | | 422/139 |
| 8,955,294 | B2 * | 2/2015 | Free .......................... | B65B 9/20 |
| | | | | 53/529 |
| 9,550,132 | B2 * | 1/2017 | Bergstra ................. | C08F 6/005 |
| 10,041,732 | B2 * | 8/2018 | Shortt ...................... | F26B 5/08 |
| 11,254,797 | B2 * | 2/2022 | Weber ...................... | B29B 9/12 |
| 11,988,448 | B1 * | 5/2024 | Yang ...................... | F26B 21/04 |
| 2010/0004408 | A1 | 1/2010 | Baita | |
| 2013/0125581 | A1 | 5/2013 | Force | |
| 2014/0202847 | A1 | 7/2014 | Bergstra | |
| 2023/0166428 | A1 * | 6/2023 | Siegl ...................... | C08F 6/005 |
| | | | | 34/403 |
| 2023/0294139 | A1 * | 9/2023 | Spiegel ................. | B29B 13/065 |
| | | | | 134/25.1 |
| 2024/0342959 | A1 * | 10/2024 | Weber ................. | B29B 17/0412 |

FOREIGN PATENT DOCUMENTS

| | | | | |
|---|---|---|---|---|
| CN | 103842138 B * | 10/2016 | .............. | B29B 7/78 |
| EP | 1671773 A1 | 6/2006 | | |
| EP | 2507022 A1 | 10/2012 | | |
| EP | 2635609 A1 | 9/2013 | | |
| EP | 4126486 B1 * | 2/2024 | .............. | B29B 9/16 |
| JP | 5537547 B2 * | 7/2014 | .............. | B29B 7/60 |
| WO | WO-2021198323 A1 * | 10/2021 | ............. | C08J 11/06 |

* cited by examiner

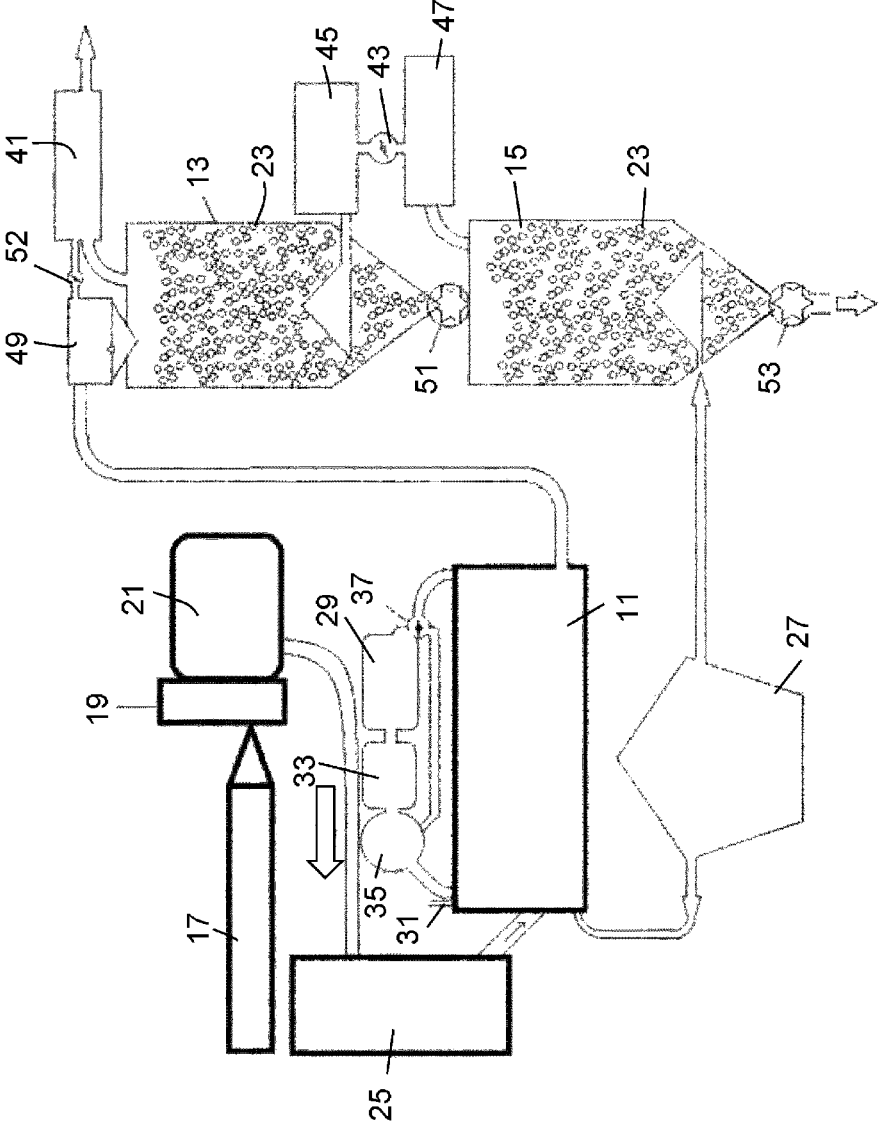

PROCESS FOR DEODORIZATION OF RECYCLED POLYOLEFIN PELLETS

CROSS-REFERENCE TO RELATED APPLICATIONS

This application is a national phase entry under 37 U.S.C § 371 of PCT/EP2021/058412 filed Mar. 31, 2021, which claims priority to Swiss Patent Application No. 00402/20 filed Apr. 3, 2020, the entirety of each of which is incorporated by this reference

FIELD OF THE INVENTION

The invention relates to a process for deodorization of recycled polyolefin pellets.

PRIOR ART

Polyolefin containers are exposed during use to different chemical substances, which migrate into the material and either directly cause a distinct odor (aromatic substances from the filling material), or indirectly after a reaction with other substances or by thermal or oxidative reaction processes. In addition, additives that can likewise lead to unpleasant odors (e.g. degradation of carnauba wax as a demolding aid) are sometimes added to the polyolefins.

As a lead substance for the purification of polyolefins, limonene is often used, since the measurement of limonene concentration has been state of the art in polyester recycling for many years and is easy to implement.

EP 2 507 022 A1 discloses a purification process for deodorization of plastic pellets, wherein the plastic pellets were extruded from used polyolefin material. With this process, the limonene content is reduced to less than 320 ppb. Hot air flows through the odorous pellets for hours and thereby stirs them. "Fresh," untreated pellets are supplied at regular intervals; treated pellets are discharged to the same extent. The supplied air is used, on the one hand, to heat the pellets and, on the other hand, to remove the volatile odor-relevant impurities. As a result of this structure, part of the pellets is cold and can only release its impurities very late, corresponding to the late heating. Worse, the impurities just removed condense onto pellets that are still cold, further contaminating them. For the heating of the discontinuously added pellets, much larger amounts of air are required than would be needed for mass transfer. Technically, the combination of heating and simultaneous decontamination therefore makes little sense.

A disadvantage of this process is, in addition, the high energy consumption, since the hot air escapes without being utilized, and hot pellets leave the process. The energy expenditure for the stirring of the pellets is also considerable. Another disadvantage is the discharge of the air with the removed contaminants into the immediate environment and the associated pollution of the environment.

Another disadvantage of this process is the lateral introduction of pressurized air, which only allows the pellets to be discharged in batches and therefore causes the process to be interrupted.

Advantages of the Invention

The disadvantages of the prior art described are addressed by an energy-saving and efficient process for deodorization of recycled polyolefin pellets.

SUMMARY

Accordingly, a process for deodorization of recycled polyolefin pellets is provided. Developments and/or advantageous alternative embodiments are also provided.

In one embodiment, the invention comprises a deodorization process in three steps:

(a) in a first step, the moist pellets are contacted with a circulating inert gas (at a temperature between 110° C. and 160° C.) in a steam stripper and the steam is precipitated in a condensate trap, by which, in the first step, odor components adhering to the surface of the pellets are removed, and the pellets are preheated.

(b) in a second step, the pellets are sent to a vacuum silo under negative pressure and contacted with a gas flowing in countercurrent, wherein odor components that have penetrated into the pellets are removed by the negative pressure and the temperature of the pellet surface remains below 123° C. for more than 10 hours.

(c) in a third step, after the vacuum silo the pellets are sent to a first heat exchanger and contacted with the gas flowing in countercurrent from the second step, by which the pellets are cooled and the gas is preheated for the second step.

The first step causes a particularly energy-saving heating of the pellets with a simultaneous virtually complete removal of the superficially adhering odor components, such as terpenes.

The second step has the following advantages: The heat transfer between the gas and the pellets is greatly limited by the negative pressure. However, the migration of the odor components and the evaporation are greatly accelerated, since the vapor pressure of the odor components increases due to the negative pressure, and the odor components become more volatile as the pressure in the vacuum silo falls. As a result of the increased gas temperature, the odor components can be better dissolved in the gas and evaporate much better. As a result of the homogeneous temperature distribution in the pellet bed or the small temperature differences in the vacuum silo, fewer odor-active substances recondense on the colder pellets or granulate grains, and these can be removed more easily from the process. Therefore, it is possible to expel odor components that are deeply embedded in the pellets and only slowly migrate to the surface. Unpleasant-smelling contaminants such as carboxylic acids, aldehydes, lactones, in particular nonanal, nonenal, butyric acid or valeric acid can be removed virtually completely from the pellets. Since the heating and the decontamination are decoupled by the first and second steps of the process, the pellets can stay much longer under an elevated temperature without sticking to one another. This is not possible with processes that have been known until now. With the present process, the pellets may remain at above 100° C. for more than 10 hours.

The third step makes it possible to achieve two objectives simultaneously: As a result of the heat exchange between the pellets and the gas, the pellets are cooled as much as possible by the cold incoming gas and the gas is preheated, so that the additional heating by a gas heater requires as little energy as possible.

In another embodiment of the invention, the condensate trap is operated as a partial flow of the inert gas circuit. It is thus not necessary to cool the entire inert gas flow in order to condense out the odor components in the condensate trap. A part of the gas flow can be fed back directly in the steam stripper. Overcharging of the condensate trap can also be prevented if part of the gas flow can be conducted past the condensate trap.

In a further embodiment of the invention, the condensate trap is operated as a second heat exchanger. The second heat exchanger can also be provided in addition to a condensate trap that is already present. The second heat exchanger can recover a part of the heating energy of the inert gas flow.

It has proven expedient if the surface temperature of the pellets in the steam stripper is between 100° C. and 120° C. As a result, the pellets for the vacuum silo are preheated. Accordingly, recondensation of odor components in the vacuum silo can be avoided.

The steam stripper is expediently a horizontally oriented rotary tube with forced conveying of the pellets by means of the rotation of the rotary tube. As a result, the contact between the inert gas flow and the pellets can be made as close as possible. This results in a further improvement in the heating of the pellets and the mass transfer of the odor components adhering to the surface of the pellets. The discharge of the contaminants via the condensate trap has proven particularly expedient, since the contaminants in the condensate, in liquid form, can be purified very effectively without the environment of the recycling plant being intensively polluted with gaseous contaminants.

In a further embodiment of the invention, the dwelling time of the pellets in the steam stripper is between 30 min and 180 min or between 50 min and 120 min. The pellets are heated rapidly to a uniform target temperature. This means that the spread of the temperature of the pellets during the treatment is low in contrast to the prior art. The recondensation of the odor components can thereby be prevented particularly effectively.

It proves advantageous if water or steam can be added via an inlet to the steam stripper. As a result, the temperature and the purification performance in the steam stripper can be set particularly precisely.

The invention also comprises that the pellet inlet and the pellet outlet of the vacuum silo have a first and a second gas-tight conveying device, respectively. As a result, the pellets can be fed continuously to the vacuum silo and removed without the vacuum silo sucking in air. The negative pressure in the vacuum silo is therefore not lost despite a continuous mode of operation.

The gas outlet of the vacuum silo expediently has a vacuum pump. As a result, a constant negative pressure can be produced in the vacuum silo, which leads to the virtually complete removal of the odor components from the pellets.

In a further embodiment of the invention, the gas at the gas inlet of the vacuum silo is guided via a second valve and a gas heater that is connected in the direction of flow. The second valve enables the precise adjustment of the negative pressure. The gas heater heats the gas to the necessary temperature if the gas has not yet reached it in the first heat exchanger.

In a further embodiment of the invention, the vacuum silo has a jacket heating unit. The jacket heating unit prevents the condensation and the deposition of odor components on the inside of the vacuum silo and thus the contamination of the vacuum silo. The jacket heating unit can be used in addition to or instead of the gas heater.

The gas may be an inert gas or oxygen-reduced air. It is essential that as little oxygen as possible is present; oxygen can trigger auto-oxidative degradation reactions of the polyolefin at the present high temperatures and thus further degrade the already recycled polyolefin.

In a further embodiment of the invention, the vacuum silo is operated at a pressure between 0.01 bar and 0.9 bar or between 0.6 bar and 0.8 bar. At this negative pressure, the advantages described above of the second process step are striking.

It proves advantageous if the pellet inlet to the first heat exchanger has the second gas-tight conveying device and the pellet outlet from the first heat exchanger has a third gas-tight conveying device. As a result, no air can be drawn into the vacuum silo via the second heat exchanger, even when the odor-free pellets are discharged from the first heat exchanger.

The gas is expediently transported from the heat exchanger into the vacuum silo through a bypass line, in which the second valve, the gas heater and an optional filter are integrated. As a result, the pellet flow is separated from the gas flow at the transition from the first heat exchanger to the vacuum silo, and the media can be treated separately from one another for optimal interaction.

In a particular embodiment of the invention, the process is operated continuously. The continuous mode of operation enables an energy-saving and efficient production of recycled polyolefin pellets that have been freed of odor.

It proves to be particularly advantageous if the pellets have a surface temperature of less than 60° C. at the pellet outlet of the third process step of the first heat exchanger. This avoids degradation of the pellet material by increased temperature after its production.

Further advantages and features become apparent from the following description of an exemplary embodiment of the invention with reference to the schematic representations. Shown, in a representation not true to scale, are:

BRIEF DESCRIPTION OF THE DRAWING

FIG. 1: Flow diagram of a process for deodorization of recycled polyolefin pellets.

DETAILED DESCRIPTION

FIG. 1 shows a flow diagram or a schematic diagram of a process for deodorization of recycled polyolefin pellets.

The process comprises three steps, wherein the first step is implemented in a steam stripper 11, the second step is implemented in a vacuum silo 13, and the third step is implemented in a first heat exchanger 15.

In a preceding step for the production of pellets or granules, flakes are first produced from used polyolefin packaging, in particular containers and closures. The polyolefin flakes are sorted out, cleaned and washed, then extruded and pelletized. During extrusion, a part of the odor-active contaminants is usually already removed via a degassing screw or melt degassing.

After melt filtration 19, the extrudate is formed into pellets 23 in an underwater pelletizer 21. Most of the water adhering to the pellets 23 is separated off in a water separator 25. From the extrusion step, the pellets 23 reach the steam stripper 11 moist and hot.

In the steam stripper 11, hot nitrogen, which can be produced in a nitrogen generator 27, at 110° to 160° C. (limonene boiling point: 175° C.), is circulated and brought into contact with the pellets 23. As a result, the pellets 23 are preheated in the vacuum silo 13 for the second step. The steam that is transported away with the circulating nitrogen can be precipitated in a condensate trap 29. If necessary, water or steam is additionally added to the steam stripper 11 via an inlet 31.

In order to keep the energy loss as low as possible, the condensate trap 29 is integrated into a first partial flow 30 of the circulating nitrogen. Downstream of the condensate trap 29, the nitrogen freed from steam is heated in a preheater 33 and fed back into the steam stripper 11 by a pump 35. The charged nitrogen can be completely or partially diverted into a second partial flow 39 via a first valve 37. As a result, the circulating nitrogen is cooled only in the first partial flow 30, and overcharging of the condensate trap 29 can be prevented by diversion into the second partial flow 39.

The steam escaping with the nitrogen carries odor components away particularly efficiently, in particular from the pellet surface, and can be separated off in the condensation trap 29. Such odor components adhering to the pellet surface are, for example, terpenes. The evaporating water cools the pellet surface and additionally prevents the pellets 23 from sticking together in the steam stripper 11.

The amount of nitrogen and temperature is regulated in such a way that adhesion or sticking together of the pellets 23 is prevented. A pellet surface temperature greater than 100° C. and less than 120° C. is sought.

In the steam stripper 11, the pellets 23 are heated to 100° C. to 120° C. in order to prevent deposition of condensate in the vacuum silo 13. The majority of the water and the impurities is separated off via the condensate trap 29.

The steam stripper 11 may be a horizontal rotary tube with forced conveying and a dwelling time range of +/−20% of the average dwelling time.

In the second step, the pellets 23 are sent to the vacuum silo 13, in which there is a negative pressure in that the pressure in the vacuum silo 13 is between 0.01 bar and 0.9 bar. In the process, a preheated gas is sucked from the bottom of the vacuum silo 13 from a vacuum pump 41 through the vacuum silo. Since the gas quantity at the gas inlet can be reduced by a second valve 43, a negative pressure can be built up by the vacuum pump 41 in the vacuum silo 13. Before the gas enters the vacuum silo 13, it is guided through a gas heater 45 and a filter 47.

The pellets 23 are loaded and removed from the vacuum silo 13 via a conveying device that is as gas-tight as possible, so that the negative pressure is not destroyed by the conveying of the pellets. Such conveying devices can be vacuum conveyors or rotary feeders. A vacuum conveyor 49 can be provided at the pellet inlet and a first rotary feeder 51 can be provided at the pellet outlet. The vacuum conveyor 49 can be connected to the vacuum pump 41 via a third valve 52.

The hot circulating gas, for example carbon dioxide, nitrogen or air with reduced oxygen content is sucked through the pellets 23 at a negative pressure.

In the case of a negative pressure, the gas is distributed better than in the case of excess air and the system can dispense with stirring mechanisms. A more efficient continuous mode of operation, instead of a discontinuous operating mode, is also possible.

The hot gas flow (>125° C.) is metered in such that the surface temperature of the pellets 23 does not exceed 123° C. As a result, the pellets 23 do not run the risk of sticking to one another. If the pellets overheated locally due to a plant stop and stuck together as a result, the temperature of the gas flow would be lowered and local agitators would be used to keep the granulate free-flowing. Air blasts, vibrations and punches that penetrate the material have proven themselves as agitators.

The melting point of the pellets can significantly limit the deodorization of the pellets 23. With the present process, two advantages of a negative pressure or a vacuum are used:

The heat transfer between the gas and the pellets 23 is greatly limited by the negative pressure. However, the migration of the odor components and the evaporation are greatly accelerated, since the vapor pressure of the odor components increases due to the negative pressure and the odor components become more volatile as the pressure in the vacuum silo falls.

As a result of the increased gas temperature, the odor components can better dissolve in the gas.

As a result of the negative pressure, odor components evaporate at significantly lower temperatures compared to the prior art.

As a result of the higher temperatures, the odor components evaporate significantly better than in the prior art.

As a result of the homogeneous pellet temperature distribution or the small differences in the pellet temperatures in the vacuum silo, fewer odor-active substances recondense onto the colder pellets or granulate grains, and these can be removed more easily from the process. Therefore, it is possible to expel odor components that are deeply embedded in the pellets and only slowly migrate to the surface. Unpleasant-smelling contaminants such as carboxylic acids, aldehydes, lactones, in particular nonanal, nonenal, butyric acid or valeric acid can therefore be removed virtually completely from the pellets 23.

Since the heating and the decontamination are decoupled by the first and second steps of the process, the pellets can stay much longer under an elevated temperature without sticking to one another. This is not possible with processes that have been known until now. With the present process, the pellets 23 may remain at above 100° C. for more than 10 hours.

The heat exchanger 15 has, above all, the task of keeping the energy loss as low as possible and stopping thermal degradation processes abruptly by cooling the pellets. The gas flows in the heat exchanger 15 in countercurrent, as a result of which the heat transfer from the pellets 23 to the gas causes preheating of the gas (entry temperature of <50° C.) and cooling of the pellets. The cooled pellets 23 or the cooled granulate are discharged from the heat exchanger 15 by means of a gas-tight conveying device, which may be in the form of a second rotary feeder 53. The gas can be nitrogen that is generated in the nitrogen generator 27.

As a result of the poor thermal conductivity, granules that are packaged while hot can release their energy to the environment only poorly and, depending on the ambient temperature, can remain hot for days and degrade accordingly. This can be prevented by providing the heat exchanger 15.

Either an inert gas or oxygen-reduced air is used as the gas, since air contains oxygen and the oxygen triggers auto-oxidative degradation processes at the very high temperatures or exhausts the primary and secondary antioxidants and damages further recycling processes. For example, the oxygen content in the air can be reduced to below 10% by volume. The inert gas used can be nitrogen that is produced from air in a nitrogen generator. It is also conceivable that carbon dioxide, which is produced during energy generation for the present process during the combustion of natural gas, is used as the inert gas.

The invention claimed is:

1. A process for deodorization of recycled polyolefin pellets extruded from used recyclable polyolefin flakes, the recycled polyolefin pellets that are still odorous being formed in an underwater pelletizer or water ring pelletizer, comprising:

in a first step, contacting recycled polyolefin pellets in a moist state with a circulating inert gas in a steam stripper, wherein steam is precipitated in a condensate trap, by which odor components adhering to surfaces of the recycled polyolefin pellets are removed, and the recycled polyolefin pellets are preheated;

in a second step, sending the recycled polyolefin pellets to a vacuum silo under a negative pressure and contacting the recycled polyolefin pellets with a gas flowing in a countercurrent, wherein odor components that have penetrated into the recycled polyolefin pellets are removed by the negative pressure and a surface temperature of the recycled polyolefin pellets remains below 123° C. for more than 10 hours, and in a third step, after the vacuum silo, sending the recycled polyolefin pellets to a first heat exchanger and contacting the recycled polyolefin pellets with the gas flowing in the countercurrent from the second step, by which the recycled polyolefin pellets are cooled and the gas is preheated for the second step.

2. The process according to claim 1, wherein the condensate trap is operated as a partial flow of the circulating inert gas.

3. The process according to claim 1, wherein the condensate trap is operated as a second heat exchanger.

4. The process according to claim 1, wherein the surface temperature of the recycled polyolefin pellets in the steam stripper is between 100° C. and 120° C.

5. The process according to claim 1, wherein the steam stripper is a horizontally oriented rotary tube with forced conveying of the recycled polyolefin pellets by rotation of the rotary tube.

6. The process according to claim 1, wherein a dwelling time of the pellets in the steam stripper is between 30 min and 180 min.

7. The process according to claim 1, wherein water or steam is added to the steam stripper via an inlet.

8. The process according to claim 1, wherein a pellet inlet and a pellet outlet of the vacuum silo have a first and a second gas-tight conveying device, respectively.

9. The process according to claim 1, wherein a gas outlet of the vacuum silo has a vacuum pump.

10. The process according to claim 1, wherein the gas at a gas inlet of the vacuum silo is guided via a valve and a gas heater that is connected in a direction of flow.

11. The process according to claim 1, wherein the vacuum silo has a jacket heating unit.

12. The process according to claim 1, wherein the gas is an inert gas or oxygen-reduced air.

13. The process according to claim 1, wherein the vacuum silo is operated at a pressure between 0.01 bar and 0.9 bar.

14. The process according to claim 8, wherein the pellet inlet to the first heat exchanger has the second gas-tight conveying device, and the pellet outlet from the first heat exchanger has a third gas-tight conveying device.

15. The process according to claim 10, wherein the gas is transported from the first heat exchanger into the vacuum silo through a bypass line, in which the valve, the gas heater and an optional filter are integrated.

16. The process according to claim 1, wherein the process is operated continuously.

17. The process according to claim 8, wherein the recycled polyolefin pellets at the pellet outlet of the first heat exchanger have a surface temperature of less than 60° C.

* * * * *